C. STILLE.
ELECTRO OPTICAL CELL.
APPLICATION FILED JAN. 30, 1915.
1,148,936.
Patented Aug. 3, 1915.
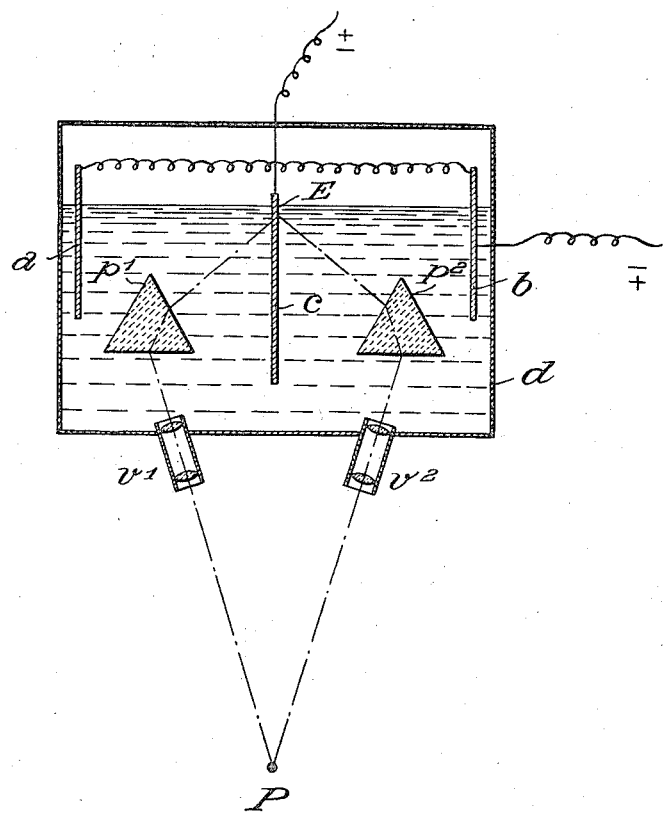
Witnesses
Inventor
Curt Stille
By Julian C. Dowell
his Attorney.

UNITED STATES PATENT OFFICE.

CURT STILLE, OF ZEHLENDORF-WEST, NEAR BERLIN, GERMANY.

ELECTRO-OPTICAL CELL.

1,148,936.      Specification of Letters Patent.      Patented Aug. 3, 1915.

Application filed January 30, 1915. Serial No. 5,280.

*To all whom it may concern:*

Be it known that I, CURT STILLE, of Zehlendorf-West, near Berlin, a subject of the King of Prussia, German Empire, have invented a certain new and useful Electro-Optical Cell; and I do hereby declare the following to be a full, clear, and exact description of the same, reference being had to the accompanying drawings, forming a part of the specification.

My invention relates to an electro-optical cell.

For photographic purposes, especially for the purposes of telephotography, it has been proposed to employ eletrolytic cells sensitive to light. Such cells consist for instance of two electrodes and an electrolyte such as sulfuric acid, one electrode being a plate of pure polished silver, and the other a silver plate coated with a chromium or iodin salt of silver. It is well known that such cells generate an E. M. F. if the coated plate is exposed to light. The E. M. F. is proportional to the intensity of light. Such plates are also useful for measuring the intensity of light. Heretofore such cells have been constructed in such a manner, that only one side of the coated plate has been made available for the purpose.

The object of the present invention is to use both sides of the electrodes, the front side as well as the rear side. This is accomplished by using a system of prisms and lenses, which guide the rays emanating from a luminous point to both sides of the electrodes.

An example of the invention is illustrated in the drawing, in a single figure representing diagrammatically the general arrangement of the system.

With reference to the figure, P is the luminous point sending rays of light to the lens systems $v_1$ $v_2$. The rays traverse the prisms $p$, $p_2$ and impinge on the electrode E on both sides.

What I do claim as my invention and desire to secure by Letters Patent, is:—

In an electrolytic-optical system the combination with an electrolytic cell having an electrode sensitive to light of a system of prisms and of lenses adapted to guide rays from a luminous point to the front side and rear side of the electrode substantially as set forth.

In testimony whereof have hereunto set hand in presence of two subscribing witnesses.

CURT STILLE.

Witnesses:
   WOLDEMAR HAUPT,
   HENRY HASPER.